(12) United States Patent
Wang et al.

(10) Patent No.: US 12,156,129 B2
(45) Date of Patent: Nov. 26, 2024

(54) DATA TRANSMISSION METHOD AND APPARATUS

(71) Applicant: Huawei Technologies Co., Ltd., Shenzhen (CN)

(72) Inventors: Hong Wang, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 491 days.

(21) Appl. No.: 17/486,170

(22) Filed: Sep. 27, 2021

(65) Prior Publication Data

US 2022/0015030 A1 Jan. 13, 2022

Related U.S. Application Data

(63) Continuation of application No. PCT/CN2019/080267, filed on Mar. 28, 2019.

(51) Int. Cl.
*H04W 48/20* (2009.01)
*H04W 24/02* (2009.01)
*H04W 48/02* (2009.01)

(52) U.S. Cl.
CPC .......... *H04W 48/20* (2013.01); *H04W 24/02* (2013.01); *H04W 48/02* (2013.01)

(58) Field of Classification Search
None
See application file for complete search history.

(56) References Cited

U.S. PATENT DOCUMENTS

| 10,972,887 B2 * | 4/2021 | Park ................. H04W 72/1273 |
| 11,171,733 B2 * | 11/2021 | Park ..................... H04J 11/0076 |
| 2014/0003301 A1 * | 1/2014 | Madan ...................... H04L 5/14 370/310 |

(Continued)

FOREIGN PATENT DOCUMENTS

| CN | 105745848 A | 7/2016 |
| CN | 106171013 A | 11/2016 |

(Continued)

OTHER PUBLICATIONS

Huawei et al., "Use of LTE Control Channel Region for DL transmission", 3GPP TSG-RAN2 Meeting #104, R2-1816922, Spokane, Washington, US, Nov. 12-16, 2018, 2 pages.

(Continued)

*Primary Examiner* — Adolf Dsouza
(74) *Attorney, Agent, or Firm* — Slater Matsil, LLP

(57) ABSTRACT

A data transmission method includes: A first access network device receives a first paging message from a core network device, where the first paging message includes a first security parameter. The first access network device sends a second paging message to a terminal device, where the second paging message includes a first random access preamble index that is ciphered and/or integrity protected by using the first security parameter. The first access network device receives a first random access preamble from the terminal device, and if the first random access preamble is a random access preamble indicated by the first random access preamble index, obtains downlink data of the terminal device. The first access network device sends the downlink data to the terminal device.

15 Claims, 7 Drawing Sheets

(56) References Cited

U.S. PATENT DOCUMENTS

2018/0092027 A1    3/2018   Sheng et al.

FOREIGN PATENT DOCUMENTS

| CN | 109155949 A | 1/2019 |
| KR | 20180136912 A | 12/2018 |
| WO | 2015146825 A1 | 10/2015 |
| WO | 2019022530 A1 | 1/2019 |

OTHER PUBLICATIONS

Alcatel-Lucent et al., "Consideration on idle mode MTC UE in enhanced coverage", 3GPP TSG-WG RAN2#85, R2-130729, Prague, Czech Republic, Feb. 10-14, 2014, 3 pages.

Huawei et al., "Use of LTE Control Channel Region for DL transmission", 3GPP TSG-RAN23 Meeting #105, R2-1900457, Athens, Greece, Feb. 25-Mar. 1, 2019, 3 pages.

3rd Generation Partnership Project; Technical Specification Group Radio Access Network; Evolved Universal Terrestrial Radio Access (E-UTRA); User Equipment (UE) procedures in idle mode (Release 15), 3GPP TS 36.304 V15.2.0, (Dec. 2018), 55 pages.

3GPP TS 36.331 V15.4.0 (Dec. 2018); 3rd Generation Partnership Project; Technical Specification Group Radio Access Network; Evolved Universal Terrestrial Radio Access (E-UTRA); Radio Resource Control (RRC); Protocol specification (Release 15); 933 pages.

* cited by examiner

DATA TRANSMISSION METHOD AND APPARATUS

CROSS-REFERENCE TO RELATED APPLICATIONS

This application is a continuation of International Application No. PCT/CN2019/080267, filed on Mar. 28, 2019, the disclosure of which is hereby incorporated by reference in its entirety.

TECHNICAL FIELD

This application relates to the field of wireless communication technologies, and in particular, to a data transmission method and apparatus.

BACKGROUND

In a communication system such as a long term evolution (LTE) system, to perform data transmission between a terminal device and a base station, a radio resource control (RRC) connection needs to be first established by using a random access (RA) process. After the RRC connection is established, the data transmission may be performed between the terminal device and the base station. In the foregoing process, a delay is relatively large, and power consumption of the terminal device is relatively high.

A machine type communication (MTC) system or a narrowband internet of things (NB-IoT) system is different from a conventional LTE system, and features data transmission with a relatively small data volume. For a scenario in which a data volume of a downlink data packet is relatively small, to reduce resource overheads for signaling transmission and power consumption of a terminal device, an early data transmission (EDT) technology is proposed. In an EDT process, after obtaining downlink data of the terminal device, a network side broadcasts a paging message, where the paging message is used to indicate the terminal device to initiate a downlink early data transmission process to a base station. After the terminal device initiates the downlink early data transmission process to the base station, the base station may send the downlink data to the terminal device after obtaining the downlink data. After receiving the downlink data, the terminal device may release a connection to the base station and maintain an idle mode. This improves data transmission efficiency.

However, because the paging message broadcast by the base station may be received by a plurality of terminal devices, when an unauthorized terminal device initiates downlink early data transmission to the base station based on the paging message, the base station sends the downlink data to an incorrect terminal device. Consequently, a receiver (namely, a correct terminal device) of the downlink data cannot normally receive the downlink data.

SUMMARY

An objective of implementations of this application is to provide a data transmission method and apparatus, to resolve a problem of how to improve downlink data transmission security in an EDT process.

According to a first aspect, an embodiment of this application provides a data transmission method, including the following.

A first access network device receives a first paging message from a core network device, where the first paging message includes a first security parameter. The first access network device sends a second paging message to a terminal device, where the second paging message includes a first random access preamble index that is ciphered and/or integrity protected by using the first security parameter. The first access network device receives a first random access preamble from the terminal device, and if the first random access preamble is a random access preamble indicated by the first random access preamble index, obtains downlink data of the terminal device. The first access network device sends the downlink data to the terminal device.

According to the foregoing method, the first random access preamble index is ciphered and/or integrity protected by using the first security parameter, so that an unauthorized terminal device can be prevented from obtaining the first random access preamble index, and then the unauthorized terminal device can be prevented from using the first random access preamble index to initiate a downlink early data transmission process to an access network device to steal downlink data. In this way, the downlink data can be sent to a terminal device to which the downlink data needs to be sent, thereby improving transmission security and reliability of the downlink data.

In a possible design, that the first access network device sends the downlink data to the terminal device includes the following.

The first access network device receives a first NAS message from the core network device, where the first NAS message includes the downlink data of the terminal device. The first access network device sends the first NAS message and feedback resource information to the terminal device, where the feedback resource information is used by the terminal device to send a first feedback message for the first NAS message.

In a possible design, the method further includes the following. The first access network device receives a second security parameter from the core network device. The first access network device may periodically receive the second security parameter from the core network device, and the second security parameter may be used to replace the first security parameter, so that a security parameter is updated in real time, and reliability of the security parameter is improved.

In a possible design, the method further includes: the feedback resource information is ciphered and/or integrity protected by using the first security parameter; or the feedback resource information is ciphered and/or integrity protected by using the second security parameter.

After the feedback resource information is ciphered and/or integrity protected, an unauthorized terminal device cannot send a feedback message based on the feedback resource information. This avoids a case in which the core network device incorrectly determines, based on the feedback message sent by the unauthorized terminal device, that downlink data is successfully sent, thereby improving transmission security and reliability of the downlink data.

In a possible design, the method includes: the first security parameter and/or the second security parameter are/is an access stratum security parameter, and the access stratum security parameter includes at least one of an NCC, $K_{ASME}$, $K_{eNB}$, $K_{RRCenc}$, $K_{RRCInt}$, $K_{UPenc}$, or $K_{UPInt}$; or the first security parameter and/or the second security parameter are/is a non-access stratum security parameter, and the non-access stratum security parameter includes at least one of $K_{ASME}$, $K_{NASInt}$, $K_{NASenc}$, or a non-access stratum NAS COUNT.

According to a second aspect, an embodiment of this application provides a data transmission method, including: A terminal device receives a second paging message from a first access network device, where the second paging message includes a first random access preamble index that is ciphered and/or integrity protected by using a first security parameter. If the terminal device successfully deciphers the first random access preamble index by using the first security parameter, and/or successfully performs integrity protection verification on the first random access preamble index by using the first security parameter, the terminal device sends a first random access preamble to the first access network device, where the first random access preamble is used to initiate a downlink early data transmission process, and the first random access preamble is a random access preamble indicated by the first random access preamble index.

According to the foregoing method, the first random access preamble index is ciphered and/or integrity protected by using the first security parameter, so that an unauthorized terminal device can be prevented from obtaining the first random access preamble index, and then the unauthorized terminal device can be prevented from using the first random access preamble index to initiate a downlink early data transmission process to an access network device to steal downlink data. In this way, the downlink data can be sent to a terminal device to which the downlink data needs to be sent, thereby improving transmission security and reliability of the downlink data.

In a possible design, the method further includes: The terminal device receives a first NAS message and feedback resource information from the first access network device, where the first NAS message includes downlink data of the terminal device, and the feedback resource information is used by the terminal device to send a first feedback message for the first NAS message. The terminal device sends the first feedback message based on the feedback resource information.

In a possible design, the feedback resource information is ciphered and/or integrity protected by using the first security parameter.

Before that the terminal device sends the first feedback message on an uplink resource scheduled by the feedback resource information, the method further includes: The terminal device successfully deciphers the feedback resource information by using the first security parameter, and/or successfully performs integrity protection verification on the feedback resource information by using the first security parameter.

According to a third aspect, an embodiment of this application provides a data transmission method, including: A core network device determines to send downlink data to a terminal device by using a downlink early data transmission process. The core network device sends a first paging message to a first access network device, where the first paging message includes a first security parameter, the first security parameter is used to cipher and/or integrity protect a first random access preamble index sent by the first access network device, and the first random access preamble index is used by the terminal device to request the downlink data from the first access network device.

According to the foregoing method, the first random access preamble index is ciphered and/or integrity protected by using the first security parameter, so that an unauthorized terminal device can be prevented from obtaining the first random access preamble index, and then the unauthorized terminal device can be prevented from using the first random access preamble index to initiate a downlink early data transmission process to an access network device to steal downlink data. In this way, the downlink data can be sent to a terminal device to which the downlink data needs to be sent, thereby improving transmission security and reliability of the downlink data.

In a possible design, the method includes: The core network device receives the first security parameter from a second access network device.

According to a fourth aspect, an embodiment of this application provides a data transmission method, including: A core network device determines to send downlink data to a terminal device by using a downlink early data transmission process. The core network device determines a first random access preamble index, and ciphering and/or integrity protecting the first random access preamble index by using a first security parameter, where the first random access preamble index is used by the terminal device to request the downlink data from a first access network device. The core network device sends, to the first access network device, the first random access preamble index that is ciphered and/or integrity protected by using the first security parameter.

According to the foregoing method, the first random access preamble index is ciphered and/or integrity protected by using the first security parameter, so that an unauthorized terminal device can be prevented from obtaining the first random access preamble index, and then the unauthorized terminal device can be prevented from using the first random access preamble index to initiate a downlink early data transmission process to an access network device to steal downlink data. In this way, the downlink data can be sent to a terminal device to which the downlink data needs to be sent, thereby improving transmission security and reliability of the downlink data.

In a possible design, the method further includes: The core network device receives at least one random access preamble index from the first access network device. That the core network device determines a first random access preamble index includes:

The core network device selects a random access preamble index from the at least one random access preamble index as the first random access preamble index.

In a possible design, that the core network device sends, to the first access network device, the first random access preamble index that is ciphered and/or integrity protected by using the first security parameter includes: The core network device sends a first paging message to the first access network device, where the first paging message includes the first random access preamble index that is ciphered and/or integrity protected by using the first security parameter.

In a possible design, the method further includes: The core network device receives a downlink data request message sent by the first access network device, where the downlink data request message is used to request the downlink data of the terminal device. The core network device sends the downlink data of the terminal device to the first access network device. The core network device receives a second feedback message sent by the first access network device, where the second feedback message includes to-be-verified data. If determining that the to-be-verified data is a part or all of the downlink data, the core network device determines that the downlink data is successfully sent; otherwise, determines that the downlink data is unsuccessfully sent.

According to a fifth aspect, an embodiment of this application provides a data transmission method, including: A first access network device receives a first random access preamble index from a core network device, where the first random access preamble index is ciphered and/or integrity protected by using a first security parameter. The first access network device sends a second paging message to a terminal device, where the second paging message includes the first random access preamble index that is ciphered and/or integrity protected by using the first security parameter. The first access network device receives a first random access preamble from the terminal device, and if the first random access preamble is a random access preamble indicated by the first random access preamble index, obtains downlink data of the terminal device. The first access network device sends the downlink data to the terminal device.

According to the foregoing method, the first random access preamble index is ciphered and/or integrity protected by using the first security parameter, so that an unauthorized terminal device can be prevented from obtaining the first random access preamble index, and then the unauthorized terminal device can be prevented from using the first random access preamble index to initiate a downlink early data transmission process to an access network device to steal downlink data. In this way, the downlink data can be sent to a terminal device to which the downlink data needs to be sent, thereby improving transmission security and reliability of the downlink data.

In a possible design, that the first access network device sends the downlink data to the terminal device includes: The first access network device receives a first NAS message from the core network device, where the first NAS message includes the downlink data of the terminal device. The first access network device sends the first NAS message and feedback resource information to the terminal device, where the feedback resource information is used by the terminal device to send a first feedback message for the first NAS message.

In a possible design, the method further includes: The first access network device receives a second security parameter from the core network device.

In a possible design, the method further includes: the feedback resource information is ciphered and/or integrity protected by using the first security parameter; or the feedback resource information is ciphered and/or integrity protected by using the second security parameter.

According to a sixth aspect, an embodiment of this application provides an apparatus. The apparatus has a function of implementing the first access network device in the first aspect to the fifth aspect. For example, the apparatus includes a module, a unit, or a means corresponding to the steps performed by the first access network device in the first aspect to the fifth aspect. The function, the unit, or the means may be implemented by using software, or may be implemented by using hardware, or may be implemented by hardware executing corresponding software.

In a possible design, the apparatus includes a processing unit and a transceiver unit. Functions performed by the processing unit and the transceiver unit may correspond to the steps performed by the first access network device in the first aspect to the fifth aspect.

In a possible design, the apparatus includes a processor, and may further include a transceiver. The transceiver is configured to send and receive a signal, and the processor executes program instructions, to complete the method performed by the first access network device in any one of the possible designs or implementations in the first aspect to the fifth aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data that are/is necessary for implementing the functions of the first access network device in the first aspect to the fifth aspect. The processor may execute the computer program instructions stored in the memory, to complete the method performed by the terminal side device in any one of the possible designs or implementations in the first aspect to the fifth aspect.

According to a seventh aspect, an embodiment of this application provides an apparatus. The apparatus has a function of implementing the core network device in the first aspect to the fifth aspect. For example, the apparatus includes a module, a unit, or a means corresponding to the steps performed by the core network device in the first aspect to the fifth aspect. The function, the unit, or the means may be implemented by using software, or may be implemented by using hardware, or may be implemented by hardware executing corresponding software.

In a possible design, the apparatus includes a processing unit and a transceiver unit. Functions performed by the processing unit and the transceiver unit may correspond to the steps performed by the core network device in the first aspect to the fifth aspect.

In a possible design, the apparatus includes a processor, and may further include a transceiver. The transceiver is configured to send and receive a signal, and the processor executes program instructions, to complete the method performed by the core network device in any one of the possible designs or implementations in the first aspect to the fifth aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data that are/is necessary for implementing the functions of the core network device in the first aspect to the fifth aspect. The processor may execute the computer program instructions stored in the memory, to complete the method performed by the terminal side device in any one of the possible designs or implementations in the first aspect to the fifth aspect.

According to an eighth aspect, an embodiment of this application provides an apparatus. The apparatus has a function of implementing the terminal device in the first aspect to the fifth aspect. For example, the apparatus includes a module, a unit, or a means corresponding to the steps performed by the terminal device in the first aspect to the fifth aspect. The function, the unit, or the means may be implemented by using software, or may be implemented by using hardware, or may be implemented by hardware executing corresponding software.

In a possible design, the apparatus includes a processing unit and a transceiver unit. Functions performed by the processing unit and the transceiver unit may correspond to the steps performed by the terminal device in the first aspect to the fifth aspect.

In a possible design, the apparatus includes a processor, and may further include a transceiver. The transceiver is configured to send and receive a signal, and the processor executes program instructions, to complete the method performed by the terminal device in any one of the possible designs or implementations in the first aspect to the fifth aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data that are/is necessary for implementing the functions of the terminal device in the first aspect to the fifth aspect. The processor may execute the computer program instructions stored in the memory, to complete the method performed by the terminal side device in any one of the possible designs or implementations in the first aspect to the fifth aspect.

An embodiment of this application provides a computer-readable storage medium. The computer storage medium stores computer-readable instructions. When a computer reads and executes the computer-readable instructions, a data transmission apparatus is enabled to perform the method in any one of the foregoing possible designs.

An embodiment of this application provides a computer program product. When a computer reads and executes the computer program product, a data transmission apparatus is enabled to perform the method in any one of the foregoing possible designs.

An embodiment of this application provides a chip. The chip is connected to a memory, and is configured to read and execute a software program stored in the memory, to implement the method in any one of the foregoing possible designs.

An embodiment of this application provides a communication system, including the first access network device, core network device, and terminal device according to any one of the foregoing aspects.

DETAILED DESCRIPTION OF ILLUSTRATIVE EMBODIMENTS

The following further describes in detail embodiments of this application with reference to the accompanying drawings.

The embodiments of this application may be used in NB-IoT, and other communication systems such as an enhanced machine type communication (eMTC) system, a new radio (NR) system, a global system for mobile communications (GSM) system, a code division multiple access (CDMA) system, a wideband code division multiple access (WCDMA) system, a long term evolution (LTE) system, and an advanced long term evolution (LTE-A) system. This is not specifically limited herein. In the embodiments of this application, an NB-IoT network scenario is used as an example to describe some scenarios. It should be noted that the solutions in the embodiments of this application may further be used in another wireless communication network, and a corresponding name may also be replaced with a name of a corresponding function in the another wireless communication network.

Figure 1:
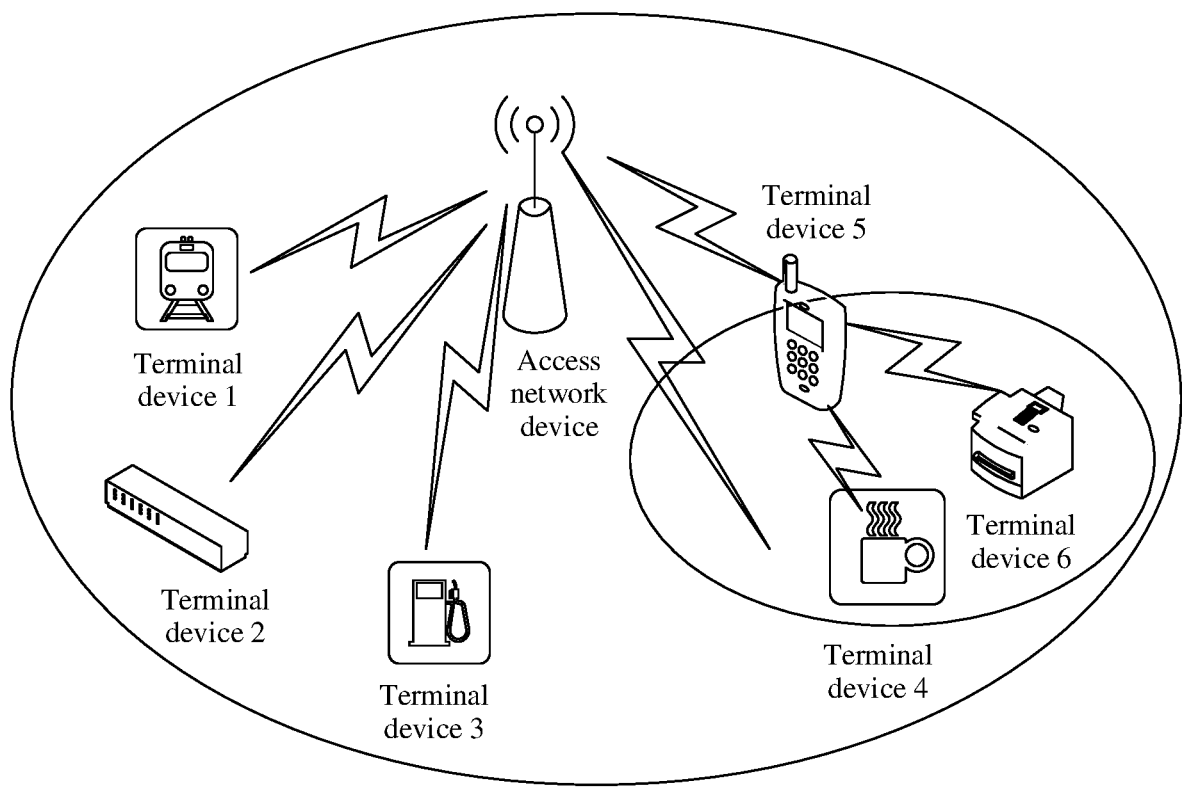
FIG. 1 is a schematic diagram of a communication system applicable to a communication method according to an embodiment of this application.

For ease of understanding the embodiments of this application, a communication system shown in FIG. 1 is first used as an example to describe in detail a communication system applicable to the embodiments of this application. FIG. 1 is a schematic diagram of a communication system applicable to a communication method according to an embodiment of this application. As shown in FIG. 1, a communication system includes an access network device and a terminal device 1 to a terminal device 6. In the communication system, the terminal device 1 to the terminal device 6 may send uplink data to the access network device, or the access network device may send downlink data to the terminal device 1 to the terminal device 6. In addition, a communication system may alternatively include the terminal device 4 to the terminal device 6. In this case, in the communication system, the access network device may send downlink data of the terminal device 4 and the terminal device 6 to the terminal device 5, and then the terminal device 5 forwards the downlink data to the terminal device 4 and the terminal device 6.

Specifically, a terminal device in the embodiments of this application is a device that provides a user with voice and/or data connectivity and that has a wireless transceiver function or a chip that can be disposed in the device. The terminal device may communicate with one or more core networks through a radio access network (RAN). The terminal device may be a mobile phone, a tablet (Pad), a computer with a wireless transceiver function, a personal digital assistant (PDA), a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and the chip that can be disposed in the foregoing terminal device are collectively referred to as a terminal device. The terminal device in the embodiments of this application may also be referred to as user equipment (UE), a user terminal, an access terminal, a subscriber unit, a subscriber station, a mobile station, a mobile station, a remote station, a remote terminal, a mobile device, a wireless communication device, a user agent, or a user apparatus.

An access network device is a device having a wireless transceiver function or a chip that can be disposed in the device. The access network device may be configured to: mutually convert a received over-the-air frame and an IP packet, and serve as a router between a terminal device and a remaining part of an access network, and may be further configured to coordinate attribute management of an air interface. The device includes but is not limited to an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (a transmission and reception point, TRP or a transmission point, TP), or the like, and may alternatively be a gNB or a transmission point in a 5G (NR) system, one antenna panel or one group (including a plurality of antenna panels) of antenna panels of a base station in the 5G system, or the like.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

Figure 2:
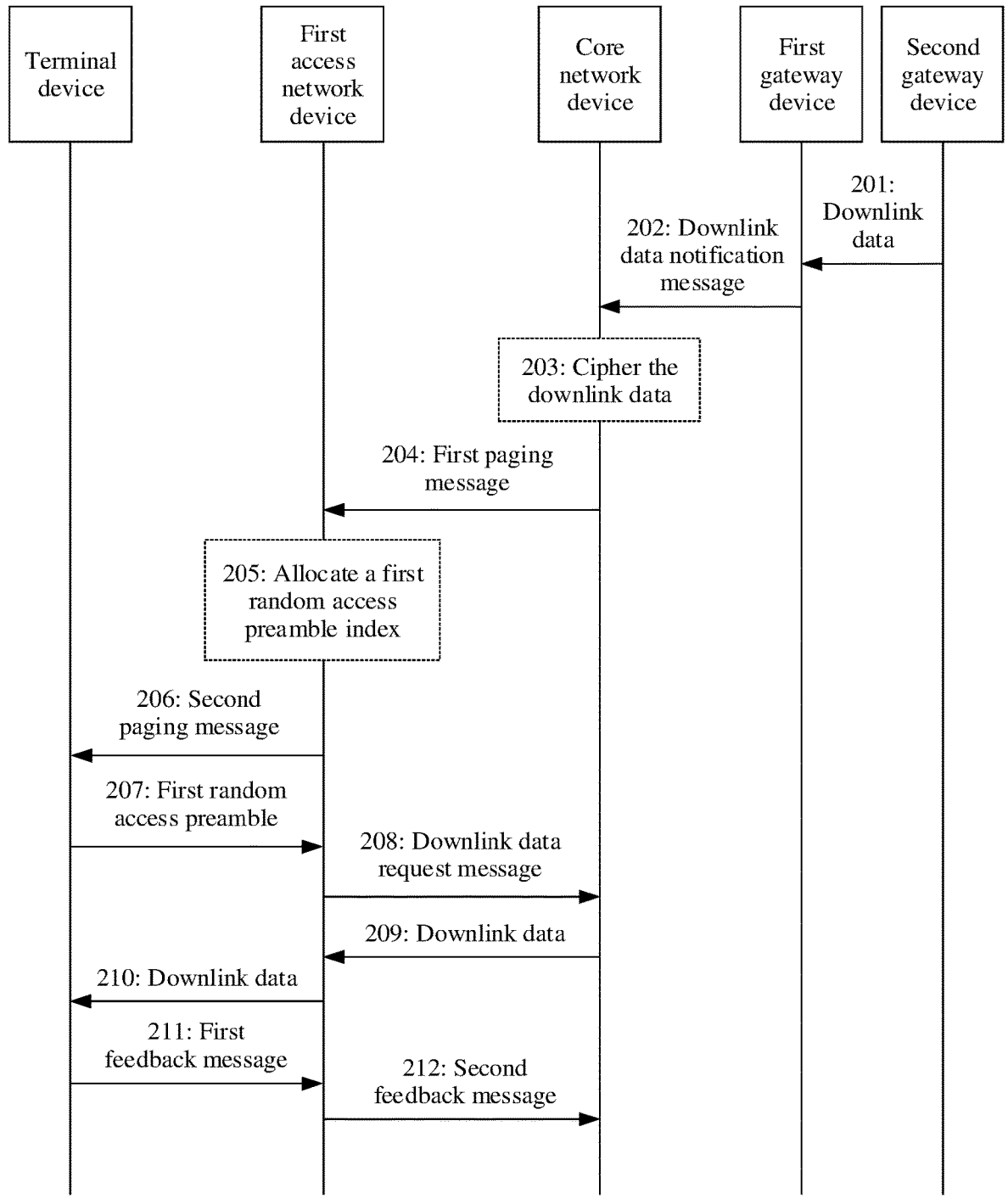
FIG. 2 is a schematic flowchart of a data transmission method according to an embodiment of this application.

With reference to the foregoing descriptions, FIG. 2 is a schematic flowchart of a data transmission method according to an embodiment of this application. Refer to FIG. 2. A procedure shown in FIG. 2 is a procedure of a downlink early data transmission (Mobile Terminated Early Data Transmission) in a control plane (CP) solution, and includes the following steps.

Step 201: A second gateway device sends downlink data of a terminal device to a first gateway device.

The first gateway device may be a serving gateway (Serving Gate Way, S-GW) device, and the second gateway device may be a public data network gateway (P-GW) device.

Step 202: The first gateway device sends a downlink data notification message to a core network device.

In a possible implementation, the downlink data notification message may carry a small data packet indication (Small data Indication), a data volume of the downlink data, or a quantity of downlink data packets.

The core network device may refer to a mobility management entity (MME).

Optionally, the downlink data notification message may further carry the downlink data of the terminal device.

For example, the first gateway device may further send another message that replaces the downlink data notification message, for example, send a small data packet transmission request (Small Data Transfer Request) message, where the small data packet transmission request message is used to request the core network device to send the downlink data by using a downlink early data transmission method. It should be noted that, when the first gateway device sends a small data packet transmission request message, after receiving the small data packet transmission request message, the core network device may feed back a small data packet transmission acknowledgement message to the first gateway device.

Optionally, if the first gateway device sends the downlink data of the terminal device to the core network device in step 202, step 203 may be further included: The core network device may cipher the downlink data by using a non-access stratum (NAS) security mechanism. For details about how to cipher the downlink data, refer to descriptions in a current technology. Details are not described herein again. In a possible implementation, step 203 may alternatively be performed between step 208 and step 209.

Step 204: The core network device sends a first paging message to a first access network device based on the received downlink data notification message.

It should be noted that the first paging message between the core network device and the first access network device may also be referred to as Si-Paging, and the first paging message includes information such as an identifier of the terminal device. In a possible implementation, the first paging message further includes a first security parameter. In a possible implementation, the first paging message may further include a non-access stratum (NAS) message transmission request, a small data packet indication (Small data Indication), a data volume of the downlink data, or a quantity of downlink data packets. The NAS message transmission request is used to indicate to send the downlink data to the terminal device.

In a possible implementation, the first security parameter may be obtained by the core network device from a second access network device. A specific obtaining manner is not limited in this embodiment of this application, and details are not described herein again.

In this embodiment of this application, the identifier of the terminal device may be a system architecture evolution temporary mobile device identifier (S-TMSI) of the terminal device, or the like. In this embodiment of this application, in a first implementation, the first security parameter is an access stratum security parameter, and includes one or more of the following: a next hop chaining count (NCC), $K_{ASME}$, $K_{eNB}$, $K_{RRCenc}$, $K_{RRCInt}$, $K_{UPenc}$, or $K_{UPInt}$. The first security parameter may alternatively be information obtained by performing a preset mathematical operation on one or more of the NCC, $K_{ASME}$, $K_{eNB}$, $K_{RRCenc}$, $K_{RRCInt}$, $K_{UPenc}$, or $K_{UPInt}$, and the preset mathematical operation includes but is not limited to a hash operation, a modulo operation, and the like.

Figure 3:
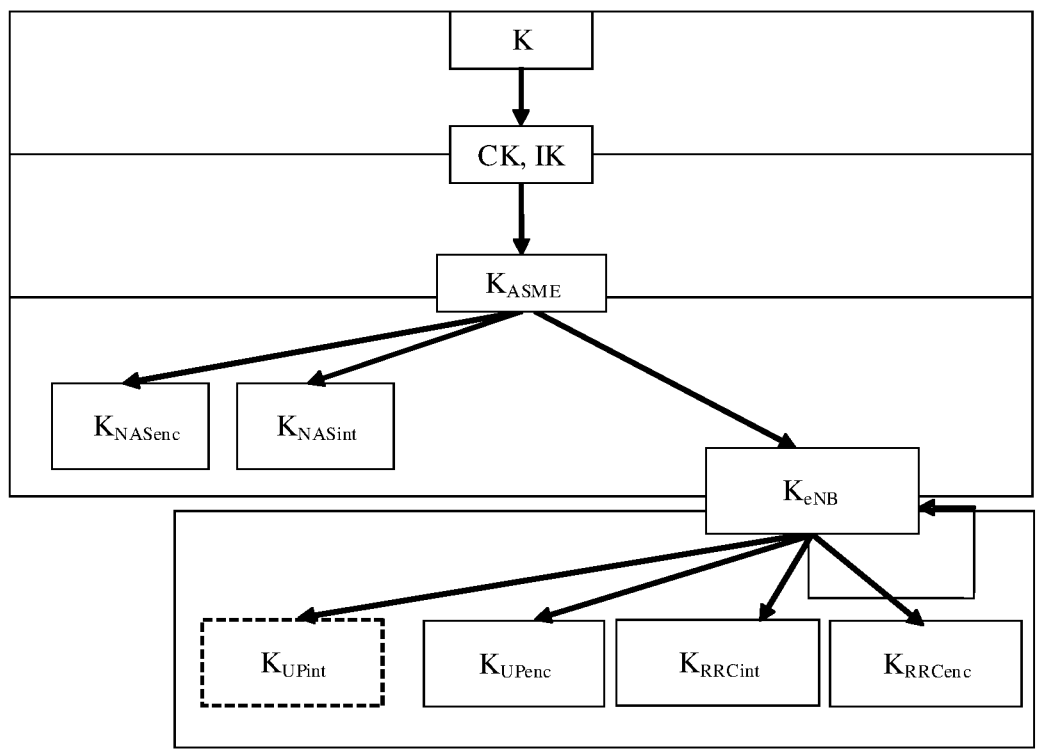
FIG. 3 is a schematic diagram of a key relationship according to an embodiment of this application.

The foregoing key derivation process may be shown in FIG. 3. For specific content of key derivation, refer to descriptions in a current technology. Details are not described herein again. It should be noted that a key K is a key stored in a universal subscriber identity module (USIM, commonly referred to as a mobile phone card) and an authentication center (AuC), and may be understood as a basic key shared between the terminal device and a network side. A cipher key (CK) and an integrity key (IK) may be derived based on the key K. $K_{ASME}$, namely, an access security management entity (ASME) key, may be derived based on the CK and the IK. $K_{eNB}$ can be derived based on $K_{ASME}$.

$K_{eNB}$ is used to derive a key $K_{RRCenc}$/$K_{RRCInt}$ for ciphering/protecting radio resource control (RRC) signaling and a key $K_{UPenc}$/$K_{UPInt}$ for ciphering/protecting user plane (UP) data.

$K_{RRCenc}$ is a key used to cipher RRC signaling by using a specific ciphering algorithm.

$K_{RRCInt}$ is a key used to protect RRC signaling by using a specific integrity protection algorithm.

$K_{UPenc}$ is a key used to cipher UP data by using a specific ciphering algorithm.

$K_{UPInt}$ is a key used to protect UP data by using a specific integrity protection algorithm.

In a second implementation, the first security parameter is a non-access stratum (NAS) security parameter, and includes at least one of $K_{ASME}$, $K_{NASInt}$, $K_{NASenc}$, or a NAS count (COUNT).

$K_{NASenc}$ is a key used to cipher NAS signaling (traffic) by using a specific ciphering algorithm.

$K_{NASInt}$ is a key used to protect NAS signaling by using a specific integrity protection algorithm.

The NAS COUNT is an input used for integrity protection and integrity verification or ciphering and deciphering.

Step 205: The first access network device determines to allocate a first random access preamble index to the terminal device.

In a possible implementation, if determining, based on the first paging message, to send the downlink data to the terminal device by using a downlink early data transmission process, the first access network device allocates the first random access preamble index to the terminal device. Optionally, the first access network device may further determine, for the terminal device, at least one of random access time-frequency resource indication information or a radio network temporary identifier (RNTI). In a possible implementation, the random access time-frequency resource indication information may include a random access time-frequency resource mask index.

In a possible implementation, the first random access preamble index is used by the terminal device to request downlink data from an access network device. In a possible implementation, the terminal device sends, by using a random access time-frequency resource indicated by the random access time-frequency resource indication information, a random access preamble indicated by the first random access preamble index.

For example, when determining that the first paging message includes the small data packet indication, the data volume of the downlink data, or the NAS message transmission request, the first access network device may determine that the downlink data needs to be sent to the terminal device by using the downlink early data transmission process.

Step 206: The first access network device sends a second paging message to the terminal device.

The second paging message may also be referred to as Uu-Paging. The second paging message includes first information, the first information is used to request the downlink data, and the first information includes the first random access preamble index. Optionally, the first information may further include at least one of the random access time-frequency resource indication information or the RNTI. For example, the first information may further include the small data packet indication (Small data Indication), the data volume of the downlink data, the quantity of downlink data packets, or a downlink early data transmission indication.

For example, parameters included in the first information may be in the following format:

```
Paging-MT-EDT ::=        SEQUENCE {
  ra-PreambleIndex         INTEGER (0..63)
  ra-PRACH-MaskIndex       INTEGER (0..15)
  rnti                     BIT STRING (SIZE (16))
}
``` ra-PreambleIndex, ra-PRACH-MaskIndex, and rnti are parameters included in the first information.

In a possible implementation, the first information may be ciphered and/or integrity protected by using the first security parameter. In a possible implementation, that the first information is ciphered by using the first security parameter may mean that the first information is directly ciphered by using a specified ciphering algorithm based on the first security parameter, may mean that the first information is ciphered by using a specified ciphering algorithm based on a key derived from the first security parameter, or may mean that a preset mathematical operation is performed on the first information and the first security parameter or a key derived from the first security parameter, where the preset mathematical operation includes but is not limited to a hash operation, a modulo operation, and the like. That the first information is integrity protected by using the first security parameter may mean that the first information is directly integrity protected by using a specified integrity protection algorithm based on the first security parameter, or may mean that the first information is integrity protected by using a specified integrity protection algorithm based on a key derived from the first security parameter.

Step 207: The terminal device sends the first random access preamble to the first access network device.

In a possible implementation, if the terminal device successfully deciphers the first information by using the first security parameter, and/or successfully performs integrity protection verification on the first information by using the first security parameter, the terminal device sends the first random access preamble to the first access network device.

In a possible implementation, the first security parameter used by the terminal device is pre-stored in the terminal device. The first random access preamble is used to initiate the downlink early data transmission process, and the first random access preamble is a random access preamble indicated by the first random access preamble index.

For example, the terminal device sends the first random access preamble by using the random access time-frequency resource indicated by the random access time-frequency resource indication information.

In a possible implementation, after the first access network device receives the first random access preamble from the terminal device, if determining that the first random access preamble is the random access preamble indicated by the first random access preamble index, the first access network device determines that the terminal device has correctly received the second paging message, so that the first access network device may obtain the downlink data of the terminal device from the core network device. Specifically, the following steps may be included.

Step 208: The first access network device sends a downlink data request message to the core network device.

The downlink data request message is used to request the downlink data of the terminal device. The downlink data request message may be at least one of an initial NAS message (initial NAS message), an attach request, a detach request, a tracking area update request a service request, an extended service request, a control plane service request, or an initial UE message. The downlink data is usually carried in a NAS protocol data unit (PDU). Therefore, the downlink data request message may also be referred to as a name such as a NAS message request message. A specific name of the downlink data request message is not limited in this embodiment of this application.

In a possible implementation, the downlink data request message carries the identifier of the terminal device.

Step 209: The core network device sends a first NAS message to the first access network device, where the first NAS message includes the downlink data of the terminal device.

In a possible implementation, if the core network device has received the downlink data from the first gateway device, the core network device sends the downlink data to the first access network device. Otherwise, the core network device requests the downlink data from the first gateway device, and then sends the downlink data to the first access network device.

For example, the core network device may cipher the downlink data of the terminal device by using the non-access stratum security mechanism. For details about how to cipher the downlink data, refer to descriptions in a current technology. Details are not described herein again.

In a possible implementation, the first NAS message is carried in at least one of a radio access bearer setup request (RAB setup request), a radio access bearer modify request (RAB modify request), a radio access bearer release command (RAB release command), an initial context setup request, a UE context release command (UE context release command), a connection establishment indication, UE information transfer, or downlink NAS transport.

Step 210: The first access network device sends the first NAS message and feedback resource information to the terminal device, where the feedback resource information is used by the terminal device to send a feedback message for the first NAS message.

In a possible implementation, the downlink data of the terminal device and the feedback resource information may be multiplexed on one transport block (tTB) for transmission.

In a possible implementation, the first access network device may send the first NAS message and the feedback resource information by using an RRC message. Optionally, the RRC message may be an RRC downlink early data transmission message.

Optionally, the first access network device may cipher and/or integrity protect the RRC message by using the first security parameter. A specific process is not described again.

In a possible implementation, the terminal device receives the feedback resource information and the first NAS message that includes the downlink data. If the terminal device successfully deciphers the feedback resource information by using the first security parameter, and/or successfully performs integrity protection verification on the feedback resource information by using the first security parameter, step 211 may be performed. In a possible implementation, if the terminal device successfully receives the first NAS message, step 211 may be performed. This is not limited in this embodiment of this application.

Step 211: The terminal device sends the first feedback message based on the feedback resource information.

The feedback resource information may indicate an uplink resource, and the terminal device may send the first feedback message on the uplink resource indicated by the feedback resource information. If the terminal device successfully receives the downlink data, the first feedback message may be an acknowledgement (ACK) message, and is used to indicate that the terminal device successfully receives the downlink data. Correspondingly, if the terminal device unsuccessfully receives the downlink data, the first feedback message may be a negative acknowledgement (NACK) message, and is used to indicate that the terminal device unsuccessfully receives the downlink data.

In a possible implementation, the first feedback message may include an ACK or a NACK of a hybrid automatic repeat request (HARQ), or include an ACK or a NACK of an automatic repeat request (ARQ), or include a pairing message/response message that includes the RRC message in step 210. For example, the first feedback message may be an RRC downlink early data transmission complete message.

Optionally, the first feedback message may further include to-be-verified data, and the to-be-verified data is a part or all of the downlink data, or the to-be-verified data is a part or all of the first NAS message.

Optionally, the first feedback message may include a second NAS message. In a possible implementation, the second NAS message includes a part or all of uplink data or a part or all of the downlink data. In a possible implementation, the second NAS message is used to verify whether the first NAS message is successfully received by the terminal device.

Step 212: The first access network device sends a second feedback message to the core network device.

Step 212 is an optional step. If the second feedback message includes the to-be-verified data, the first access network device forwards the to-be-verified data to the core network device. Alternatively, if the second feedback message includes the second NAS message, the first access network device forwards the second NAS message to the core network device.

If the second feedback message carries the to-be-verified data, and the core network device determines that the to-be-verified data is a part or all of the downlink data, the core network device determines that the downlink data is successfully sent; otherwise, determines that the downlink data is unsuccessfully sent.

Alternatively, if the second feedback message carries the to-be-verified data, and the core network device determines that the to-be-verified data is a part or all of the first NAS message, the core network device determines that the downlink data is successfully sent; otherwise, determines that the downlink data is unsuccessfully sent.

Alternatively, if the second feedback message carries the second NAS message, and the core network device determines that the second NAS message includes the uplink data, the core network device determines that the downlink data is successfully sent; otherwise, determines that the downlink data is unsuccessfully sent.

Alternatively, if the second feedback message carries the second NAS message, and the core network device determines that the second NAS message includes a part or all of the downlink data, the core network device determines that the downlink data is successfully sent; otherwise, determines that the downlink data is unsuccessfully sent.

According to the foregoing method, the first information is ciphered and/or integrity protected by using the first security parameter, so that an unauthorized terminal device can be prevented from obtaining the first information, and then the unauthorized terminal device can be prevented from using the random access information in the first information to initiate a downlink early data transmission process to an access network device to steal downlink data. In this way, the downlink data can be sent to a terminal device to which the downlink data needs to be sent, thereby improving transmission security and reliability of the downlink data.

Figure 4:
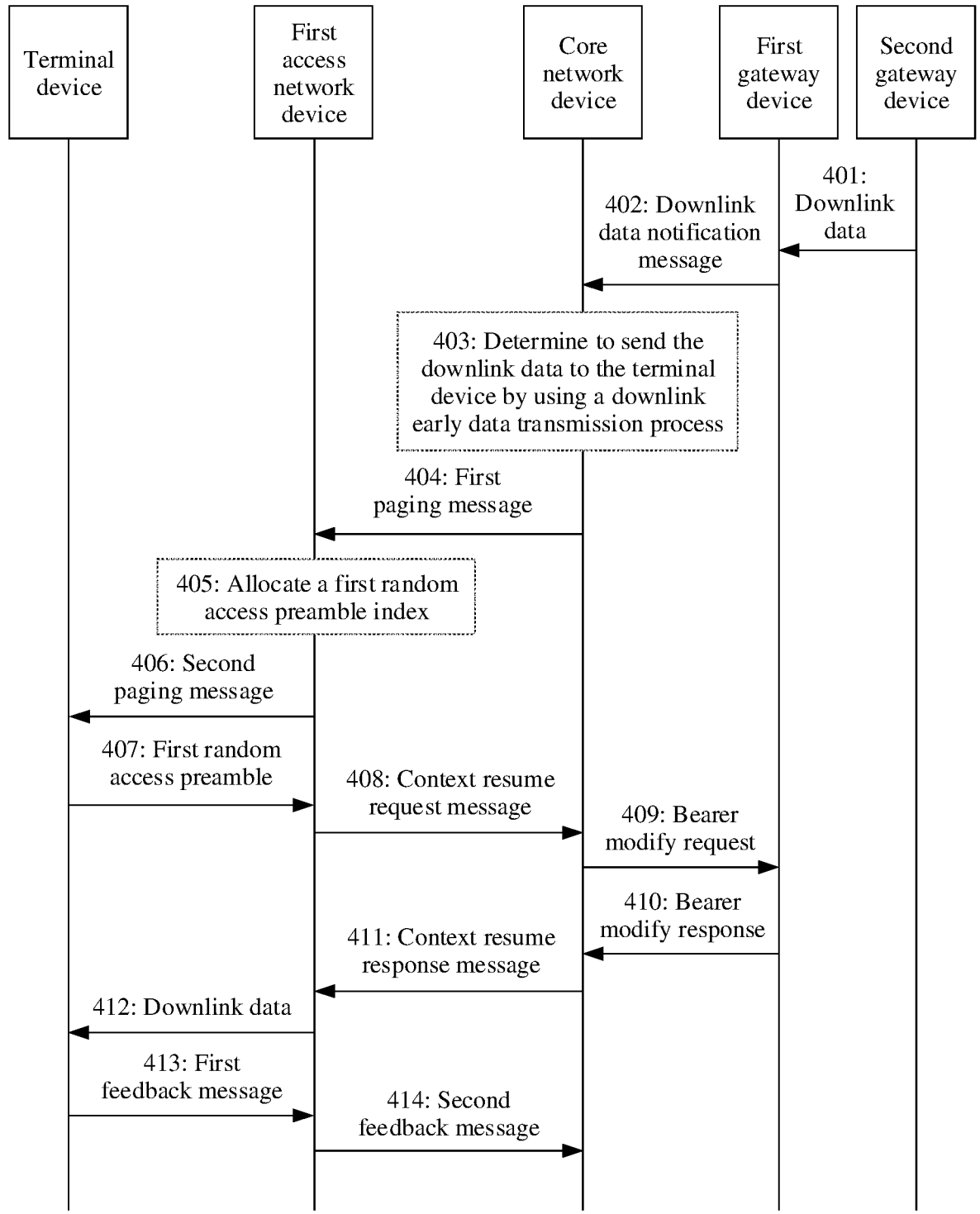
FIG. 4 is a schematic flowchart of a data transmission method according to an embodiment of this application.

This embodiment of this application may be also applicable to downlink early data transmission in a UP solution. In a downlink early data transmission process in the UP solution, downlink data is sent to the terminal device by using the second gateway device (for example, the P-GW), the first gateway device (for example, the S-GW), and the access network device. In other words, the downlink data is sent to the terminal device not through the core network device. Specifically, FIG. 4 is a schematic flowchart of a data transmission method according to an embodiment of this application. Refer to FIG. 4. A procedure shown in FIG. 4 includes the following steps.

Step 401: A second gateway device sends downlink data to a first gateway device.

The first gateway device may be an S-GW, and the second gateway device may be a P-GW.

Step 402: The first gateway device sends a downlink data notification message to a core network device.

In a possible implementation, the downlink data notification message may carry a small data packet indication, a data volume of the downlink data, or a quantity of downlink data packets.

The core network device may be an MME.

Step 403: The core network device determines, based on the received downlink data notification message, to send the downlink data to a terminal device by using a downlink early data transmission process.

It should be noted that how the core network device specifically determines whether to send the downlink data to the terminal device by using the downlink early data transmission process is not limited in this embodiment of this application. In a possible implementation, if the core network device determines that the data volume of the downlink data is relatively small and the downlink data can be all transmitted through one message, the core network device determines to send the downlink data to the terminal device by using the downlink early data transmission process.

In a possible implementation, when the core network device determines to send the downlink data to the terminal device by using the downlink early data transmission process, step 404 is performed.

Step 404: The core network device sends a first paging message to a first access network device.

It should be noted that the first paging message may also be referred to as Si-Paging. In a possible implementation, the first paging message further includes a first security parameter. The first security parameter may be obtained by the core network device from a second access network device. A specific obtaining manner is not limited in this embodiment of this application, and details are not described herein again.

In a possible implementation, the first paging message may further include information such as an identifier of the terminal device. In a possible implementation, the first paging message may further include a non-access stratum (NAS) message transmission request, a small data packet indication (Small data Indication), a data volume of the downlink data, a quantity of downlink data packets, or a downlink early data transmission indication. The NAS message transmission request is used to indicate to send the downlink data to the terminal device.

It should be noted that, for specific content of the first security parameter, refer to descriptions in step 204, and details are not described herein again.

Step 405: The first access network device determines to allocate a first random access preamble index to the terminal device.

In a possible implementation, the first access network device allocates the first random access preamble index to the terminal device based on the first paging message. Optionally, the first access network device may further determine, for the terminal device, at least one of random access time-frequency resource indication information or an RNTI. In a possible implementation, the random access time-frequency resource indication information may include a random access time-frequency resource mask index.

Step 406: The first access network device sends a second paging message to the terminal device.

The second paging message may also be referred to as Uu-Paging. The second paging message includes first information, the first information is used to request the downlink data, and the first information includes the first random access preamble index. In a possible implementation, the first information may further include at least one of the random access time-frequency resource indication information or the RNTI. For example, the first information may further include the small data packet indication (Small data Indication), the data volume of the downlink data, the quantity of downlink data packets, or the downlink early data transmission indication.

For example, parameters included in the second paging message may be in the following format:

| | |
|---|---|
| Paging-MT-EDT::= | SEQUENCE { |
| ra-PreambleIndex | INTEGER (0..63) ra-PRACH- |
| MaskIndex | INTEGER (0..15) |
| rnti | BIT STRING (SIZE (16)) |
| } | | ra-PreambleIndex, ra-PRACH-MaskIndex, and rnti are parameters included in the first information.

In a possible implementation, the first information may be ciphered and/or integrity protected by using the first security parameter. In a possible implementation, that the first information is ciphered by using the first security parameter may mean that the first information is directly ciphered by using a specified ciphering algorithm based on the first security parameter, may mean that the first information is ciphered by using a specified ciphering algorithm based on a key derived from the first security parameter, or may mean that a preset mathematical operation is performed on the first information and the first security parameter or a key derived from the first security parameter, where the preset mathematical operation includes but is not limited to a hash operation, a modulo operation, and the like. That the first information is integrity protected by using the first security parameter may mean that the first information is directly integrity protected by using a specified integrity protection algorithm based on the first security parameter, or may mean that the first information is integrity protected by using a specified integrity protection algorithm based on a key derived from the first security parameter.

Step 407: The terminal device sends a first random access preamble to the first access network device.

In a possible implementation, when the terminal device receives the second paging message, and the second paging message carries the downlink early data transmission indication, or carries the random access time-frequency resource indication information used for downlink early data transmission, or carries the first information, the terminal device resumes context information of the terminal, and activates a security context. If the terminal device stores a previously allocated NCC, the terminal device performs key derivation.

In a possible implementation, if the terminal device successfully deciphers the first information by using the first security parameter, and/or successfully performs integrity protection verification on the first information by using the first security parameter, the terminal device sends the first random access preamble to the first access network device.

In a possible implementation, the first security parameter used by the terminal device is pre-stored in the terminal device. The first random access preamble is used to initiate the downlink early data transmission process, and the first random access preamble is a random access preamble indicated by the first random access preamble index.

After the first access network device receives the first random access preamble from the terminal device, if determining that the first random access preamble is the random access preamble indicated by the first random access preamble index, the first access network device determines that the terminal device has correctly received the second paging message, so that the first access network device may obtain the downlink data of the terminal device. Specifically, the following steps may be included.

Step 408: The first access network device sends a terminal device context resume request (UE Context Resume Request) message to the core network device.

Step 409: The core network device sends a bearer modify request to the first gateway device.

Step 410: After completing bearer modification, the first gateway device sends a bearer modify response to the core network device.

Step 411: The core network device sends a terminal device context resume response (UE Context Resume response) message to the first access network device.

In a possible implementation, after step 408 to step 411, the first access network device sends the downlink data of the terminal device to the terminal device.

Step 412: The first access network device sends the downlink data and a first RRC message to the terminal device.

In a possible implementation, when the first access network device receives the downlink data from a first gateway, the first access network device resumes the context information of the terminal device, activates the security context, and obtains a second security parameter and a third security parameter, where the second security parameter includes $K_{UPenc}$ and $K_{UPInt}$, and the third security parameter includes $K_{RRCenc}$ and $K_{RRCInt}$.

In a possible implementation, the downlink data is carried on a downlink traffic channel (DTCH), and the downlink data is carried on a data radio bearer (DRB). In a possible implementation, the downlink data is ciphered and/or integrity protected by using the second security parameter.

In a possible implementation, the first RRC message includes feedback resource information, and the feedback resource information is used by the terminal device to send a feedback message for the downlink data.

In a possible implementation, the first RRC message includes at least one of an NCC or a resume identifier (Resume ID). In a possible implementation, the NCC is used for subsequent data transmission. In another possible implementation, the NCC is used to receive the downlink data.

For example, the downlink data of the terminal device and the first RRC message may be multiplexed on one TB for transmission.

Optionally, the first access network device may cipher and/or integrity protect the first RRC message by using the first security parameter or the third security parameter. A specific process is not described again.

Optionally, the RRC message may be an RRC downlink early data transmission message.

In a possible implementation, if the second paging message carries the RNTI and the terminal device detects downlink control information by using the RNTI, or if the terminal device receives the first RRC message and the downlink data on a DCCH and the DTCH, the terminal device resumes the context information of the terminal, and activates the security context.

In a possible implementation, if the terminal device stores the previously allocated NCC, the terminal device performs key derivation to obtain a fourth security parameter and a fifth security parameter, where the fourth security parameter is the same as the second security parameter, and the fifth security parameter is the same as the third security parameter. The fourth security parameter is used to decipher and/or verify the downlink data, and the fifth security parameter is used to decipher and/or verify the first RRC message.

The terminal device receives the downlink data and the RRC message. In a possible implementation, if the terminal device successfully deciphers the first RRC message by using the first security parameter or the fifth security parameter, and/or successfully performs integrity protection verification on the first RRC message by using the first security parameter or the fifth security parameter, step 413 may be performed. This is not limited in this embodiment of this application.

Step 413: The terminal device sends a first feedback message to the first access network device.

In a possible implementation, the feedback resource information may indicate an uplink resource, and the terminal device may send the first feedback message on the uplink resource indicated by the feedback resource information. If the terminal device successfully receives the downlink data, the first feedback message may be an acknowledgement (ACK) message, and is used to indicate that the terminal device successfully receives the downlink data. Correspondingly, if the terminal device unsuccessfully receives the downlink data, the first feedback message may be a negative acknowledgement (NACK) message, and is used to indicate that the terminal device unsuccessfully receives the downlink data.

In a possible implementation, the first feedback message may include an ACK or a NACK of a HARQ, or include an ACK or a NACK of an ARQ, or include a pairing message/response message that includes the RRC message in step 412. For example, the first feedback message may be an RRC downlink early data transmission complete message.

In a possible implementation, the first feedback message is an RRC message, and the RRC message is ciphered and/or integrity protected by using the fifth security parameter.

Step 414: The first access network device sends a second feedback message to the core network device.

In a possible implementation, the second feedback message may be a terminal device context suspend request (UE context suspend request), and the second feedback message is used to request to suspend a context of the terminal device.

According to the foregoing method, the first information is ciphered and/or integrity protected by using the first security parameter, so that an unauthorized terminal device can be prevented from obtaining the first information, and then the unauthorized terminal device can be prevented from using the random access information in the first information to initiate a downlink early data transmission process to an access network device to steal downlink data. In this way, the downlink data can be sent to a terminal device to which the downlink data needs to be sent, thereby improving transmission security and reliability of the downlink data.

In the procedures shown in FIG. 2 to FIG. 4, the first access network device ciphers and/or integrity protects the first information. In the embodiments of this application, alternatively, the core network device may cipher and/or integrity protect the first information. The following separately provides descriptions.

Figure 5:
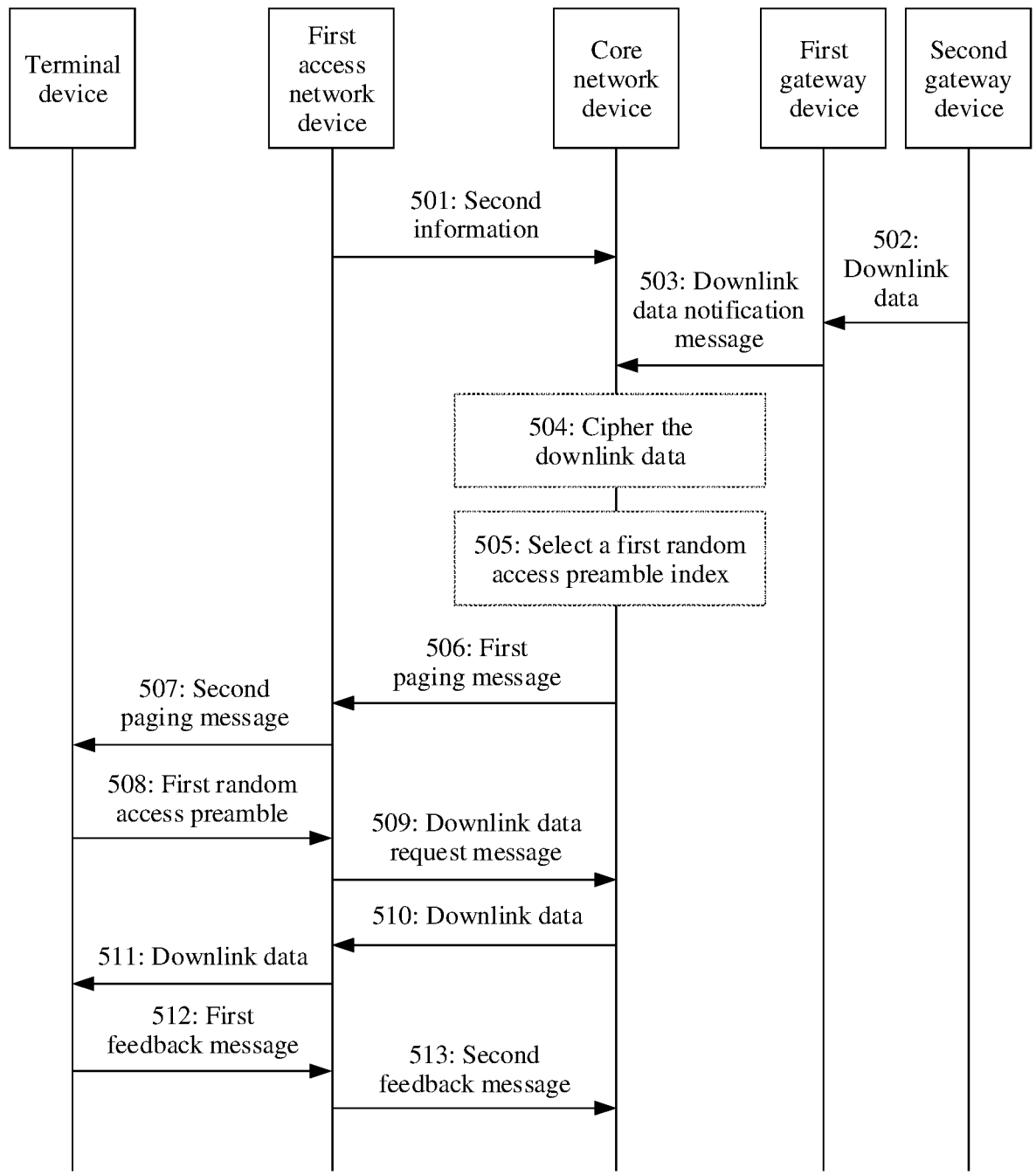
FIG. 5 is a schematic flowchart of a data transmission method according to an embodiment of this application.

FIG. 5 is a schematic flowchart of a data transmission method according to an embodiment of this application.

Refer to FIG. 5. A procedure shown in FIG. 5 is a procedure of downlink early data transmission in a CP solution, and includes the following steps.

Step 501: A first access network device sends second information to a core network device, where the second information includes at least one random access preamble index.

In a possible implementation, the second information may further include at least one random access time-frequency resource mask index.

In a possible implementation, the second information may further include at least one RNTI.

Step 502: A second gateway device sends downlink data to a first gateway device.

The first gateway device may be an S-GW, and the second gateway device may be a P-GW.

Step 503: The first gateway device sends a downlink data notification ( ) message to the core network device.

In a possible implementation, the downlink data notification message may carry a small data packet indication (Small data Indication), a data volume of the downlink data, or a quantity of downlink data packets.

The core network device may be an MME.

Optionally, the downlink data notification message may further carry the downlink data of a terminal device.

For example, the first gateway device may further send another message that replaces the downlink data notification message, for example, send a small data packet transmission request (Small Data Transfer Request) message, where the small data packet transmission request message is used to request the core network device to determine whether the downlink data can be sent by using a downlink early data transmission method. It should be noted that, when the first gateway device sends a small data packet transmission request message, after receiving the small data packet transmission request message, the core network device may feed back a small data packet transmission acknowledgement message to the first gateway device.

Optionally, if the first gateway device sends the downlink data of the terminal device to the core network device in step 503, step 504 may be further included: The core network device may cipher the downlink data by using a NAS security mechanism. For details about how to cipher the downlink data, refer to descriptions in a current technology. Details are not described herein again.

Step 505: The core network device determines first information based on the downlink data notification message, where the first information includes a first random access preamble index, and a first random access preamble indicated by the first random access preamble index is used by the terminal device to request the downlink data.

In a possible implementation, if the core network device determines, based on the downlink data notification message, that the downlink data can be sent to the terminal device by using a downlink early data transmission process, the core network device selects a random access preamble index, as the first random access preamble index, from at least one random access preamble index included in the second information.

In a possible implementation, if the second information includes at least one random access time-frequency resource mask index, the first information further includes a first random access time-frequency resource mask index. In a possible implementation, if the core network device determines, based on the downlink data notification message, that the downlink data can be sent to the terminal device by using a downlink early data transmission process, the core network device selects a random access time-frequency resource mask index, as the first random access time-frequency resource mask index, from at least one random time-frequency resource mask index included in the second information.

In a possible implementation, if the second information includes at least one RNTI, the first information further includes a first RNTI. In a possible implementation, if the core network device determines, based on the downlink data notification message, that the downlink data can be sent to the terminal device by using a downlink early data transmission process, the core network device selects an RNTI, as the first RNTI, from at least one RNTI included in the second information.

How the core network device determines to send the downlink data to the terminal device by using the downlink early data transmission process and how the core network device specifically determines the first information are not limited in this embodiment of this application, and details are not described herein again.

In a possible implementation, the first information may be ciphered and/or integrity protected by using a first security parameter. It should be noted that, that the first information is ciphered by using the first security parameter may mean that the first information is directly ciphered by using a specified ciphering algorithm based on the first security parameter, may mean that the first information is ciphered by using a specified ciphering algorithm based on a key derived from the first security parameter, or may mean that a preset mathematical operation is performed on the first information and the first security parameter or a key derived from the first security parameter, where the preset mathematical operation includes but is not limited to a hash operation, a modulo operation, and the like. That the first information is integrity protected by using the first security parameter may mean that the first information is directly integrity protected by using a specified integrity protection algorithm based on the first security parameter, or may mean that the first information is integrity protected by using a specified integrity protection algorithm based on a key derived from the first security parameter. In a possible implementation, the first security parameter may be obtained by the core network device from a second access network device. A specific obtaining manner is not limited in this embodiment of this application, and details are not described herein again. For specific content of the first security parameter and an identifier of the terminal device, refer to descriptions in step 204. Details are not described herein again.

Step 506: The core network device sends a first paging message to the first access network device.

In a possible implementation, the first paging message may include the first information. In a possible implementation, the first paging message may further include information such as the identifier of the terminal device.

In a possible implementation, the first paging message may further include a NAS message transmission request, a small data packet indication (Small data Indication), a data volume of the downlink data, a quantity of downlink data packets, or a downlink early data transmission indication. The NAS message transmission request is used to indicate to send the downlink data to the terminal device.

Step 507: The first access network device sends a second paging message to the terminal device.

The second paging message may also be referred to as Uu-Paging. The second paging message includes the first information. In a possible implementation, the second paging message may further include a small data packet indication (Small data Indication), a data volume of the downlink data, or a downlink early data transmission indication.

Step 508: The terminal device sends a first random access preamble to the first access network device.

In a possible implementation, if the terminal device successfully deciphers the first information in the second paging message by using the first security parameter, and/or successfully performs integrity protection verification on the first information by using the first security parameter, the terminal device sends the first random access preamble to the first access network device.

In a possible implementation, the first security parameter used by the terminal device is pre-stored in the terminal device. The first random access preamble is used to initiate the downlink early data transmission process, and the first random access preamble is a random access preamble indicated by the first random access preamble index.

In a possible implementation, the terminal device sends the first random access preamble by using a first random access time-frequency resource indicated by the first random access time-frequency resource mask index in the first information.

In a possible implementation, after the first access network device receives the first random access preamble from the terminal device, if determining that the first random access preamble is the random access preamble indicated by the first random access preamble index, the first access network device determines that the terminal device has correctly received the second paging message, so that the first access network device may obtain the downlink data of the terminal device from the core network device. Specifically, the following steps may be included.

Step 509: The first access network device sends a downlink data request message to the core network device.

The downlink data request message is used to request the downlink data of the terminal device. The downlink data request message may also be referred to as a name such as a NAS message request message. This is not limited in this embodiment of this application. For example, the downlink data request message may be at least one of an initial NAS message, an attach request, a detach request, a tracking area update request, a service request, an extended service request, a control plane service request, or an initial UE message.

In a possible implementation, the downlink data request message carries the identifier of the terminal device.

Step 510: The core network device sends the downlink data of the terminal device to the first access network device.

In a possible implementation, if the core network device has received the downlink data from the first gateway device, the core network device sends the downlink data to the first access network device. Otherwise, the core network device requests the downlink data from the first gateway device, and then sends the downlink data to the first access network device.

For example, the core network device may cipher the downlink data of the terminal device by using the non-access stratum security mechanism. For details about how to cipher the downlink data, refer to descriptions in a current technology. Details are not described herein again.

In a possible implementation, the downlink data of the terminal device is carried in at least one of a radio access bearer device request (RAB setup request), a radio access bearer modify request (RAB modify request), a radio access bearer release command (RAB release command), an initial context setup request (initial context setup request), a UE context release command, a connection establishment indication, UE information transfer, or downlink NAS transport.

Step 511: The first access network device sends a first NAS message and feedback resource information to the terminal device.

The feedback resource information is used by the terminal device to send a feedback message for the first NAS message. The first NAS message includes the downlink data of the terminal device.

In a possible implementation, the downlink data of the terminal device and the feedback resource information may be multiplexed on one TB for transmission.

In a possible implementation, the first access network device may send the first NAS message and the feedback resource information by using an RRC message. Optionally, the RRC message may be an RRC downlink early data transmission message.

Optionally, the first access network device may cipher and/or integrity protect the RRC message by using the first security parameter. A specific process is not described again.

In a possible implementation, the terminal device receives the feedback resource information and the first NAS message that includes the downlink data. If the terminal device successfully deciphers the feedback resource information by using the first security parameter, and/or successfully performs integrity protection verification on the feedback resource information by using the first security parameter, step 512 may be performed. In a possible implementation, if the terminal device successfully receives the first NAS message, step 512 may be performed. This is not limited in this embodiment of this application.

Step 512: The terminal device sends the first feedback message based on the feedback resource information.

The feedback resource information may indicate an uplink resource, and the terminal device may send the first feedback message on the uplink resource indicated by the feedback resource information. If the terminal device successfully receives the downlink data, the feedback message may be an acknowledgement (ACK) message, and is used to indicate that the terminal device successfully receives the downlink data. Correspondingly, if the terminal device unsuccessfully receives the downlink data, the feedback message may be a negative acknowledgement (neNACK) message, and is used to indicate that the terminal device unsuccessfully receives the downlink data.

In a possible implementation, the first feedback message may include an ACK or a NACK of a HARQ, or include an ACK or a NACK of an ARQ, or include a pairing message/response message that includes the RRC message in step 511. For example, the first feedback message may be an RRC downlink early data transmission complete message.

Optionally, the first feedback message may further include to-be-verified data, and the to-be-verified data is a part or all of the downlink data, or the to-be-verified data is a part or all of the first NAS message.

If determining that the to-be-verified data is a part or all of the downlink data, the core network device determines that the downlink data is successfully sent; otherwise, determines that the downlink data is unsuccessfully sent.

Step 513: The first access network device sends a second feedback message to the core network device.

Step 513 is an optional step. If the second feedback message includes the to-be-verified data, the first access network device forwards the to-be-verified data to the core network device. Alternatively, if the second feedback message includes the second NAS message, the first access network device forwards the second NAS message to the core network device.

If the second feedback message carries the to-be-verified data, and the core network device determines that the to-be-verified data is a part or all of the downlink data, the core network device determines that the downlink data is successfully sent; otherwise, determines that the downlink data is unsuccessfully sent.

Alternatively, if the second feedback message carries the to-be-verified data, and the core network device determines that the to-be-verified data is a part or all of the first NAS message, the core network device determines that the downlink data is successfully sent; otherwise, determines that the downlink data is unsuccessfully sent.

Alternatively, if the second feedback message carries the second NAS message, and the core network device determines that the second NAS message includes the uplink data, the core network device determines that the downlink data is successfully sent; otherwise, determines that the downlink data is unsuccessfully sent.

Alternatively, if the second feedback message carries the second NAS message, and the core network device determines that the second NAS message includes a part or all of the downlink data, the core network device determines that the downlink data is successfully sent; otherwise, determines that the downlink data is unsuccessfully sent.

According to the foregoing method, the first information is ciphered and/or integrity protected by using the first security parameter, so that an unauthorized terminal device can be prevented from obtaining the first information, and then the unauthorized terminal device can be prevented from using the random access information in the first information to initiate a downlink early data transmission process to an access network device to steal downlink data. In this way, the downlink data can be sent to a terminal device to which the downlink data needs to be sent, thereby improving transmission security and reliability of the downlink data.

In this embodiment of this application, a solution in which the core network device ciphers and/or integrity protects the first random access preamble index may also be used in a procedure of downlink early data transmission in a UP solution. When the solution is used in the downlink early data transmission in the UP solution, the procedure in FIG. 4 may be adaptively modified with reference to the procedures in FIG. 4 and FIG. 5, and a specific process is not described again.

For example, in the procedure in FIG. 5, step 501 is an optional step. When step 501 does not exist, the first access network device may directly send the first random access preamble index to the core network device, so that the core network device ciphers and/or integrity protects the first random access preamble index. For details, refer to a procedure shown in FIG. 6.

Figure 6:
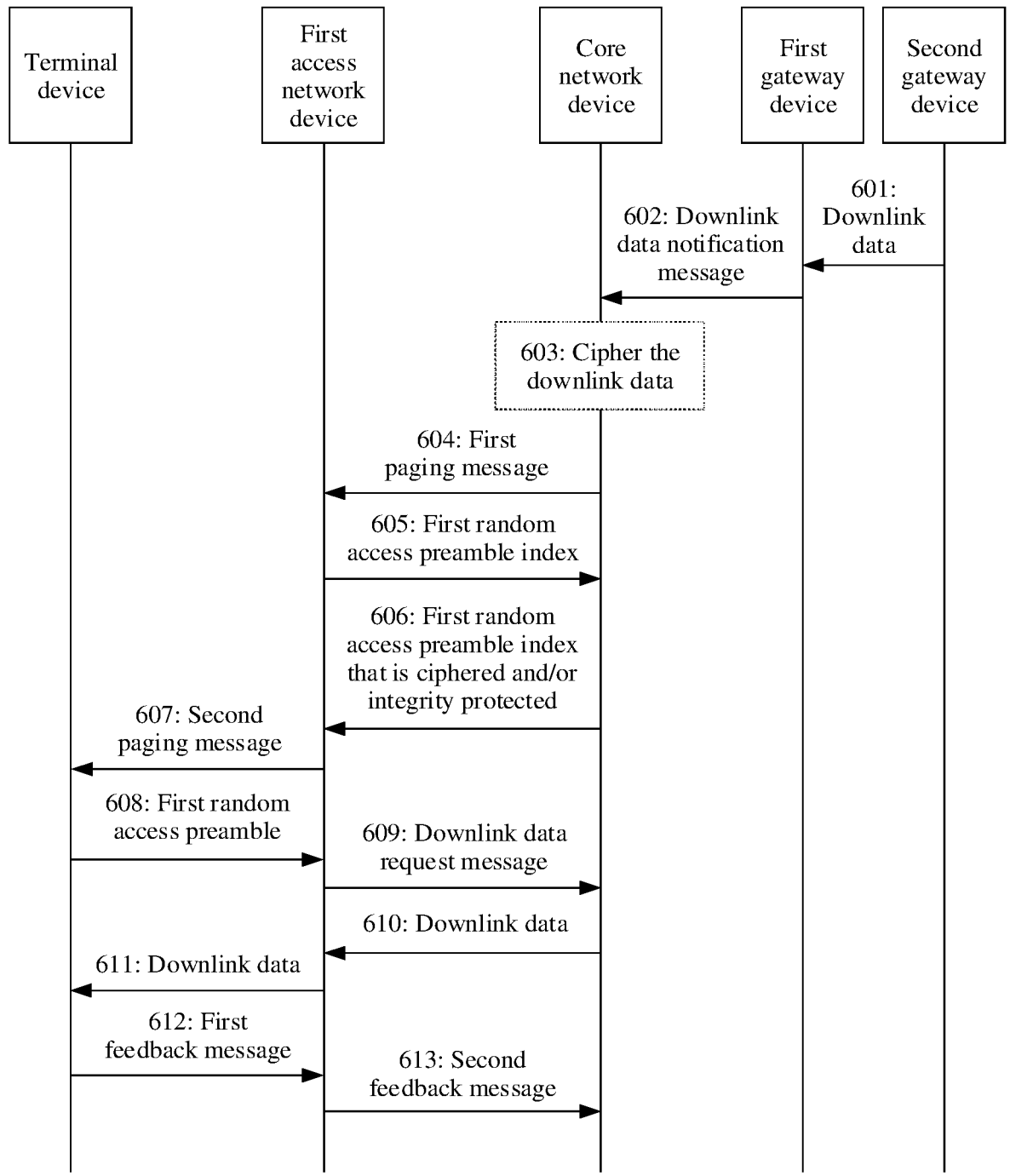
FIG. 6 is a schematic flowchart of a data transmission method according to an embodiment of this application.

FIG. 6 is a schematic flowchart of a data transmission method according to an embodiment of this application. Refer to FIG. 6. A procedure shown in FIG. 6 is a procedure of downlink early data transmission in a CP solution, and includes the following steps.

Step 601: A second gateway device sends downlink data to a first gateway device.

Step 602: The first gateway device sends a downlink data notification message to a core network device, where the downlink data notification message may carry a small data packet indication (Small data Indication), a data volume of the downlink data, or a quantity of downlink data packets.

The core network device may be an MME.

Optionally, the downlink data notification message may further carry the downlink data of the terminal device.

Optionally, if the first gateway device sends the downlink data of the terminal device to the core network device in step 602, step 603 may be further included: The core network device may cipher the downlink data by using a NAS security mechanism. For details about how to cipher the downlink data, refer to descriptions in a current technology. Details are not described herein again.

Step 604: The core network device sends a first paging message to a first access network device based on the received downlink data notification message.

For specific content of step 601 to step 604, refer to descriptions of corresponding steps in the procedure in FIG. 5. Details are not described herein again.

Step 605: The first access network device sends a first random access preamble index to the core network device.

Specifically, if the first access network device determines, based on the first paging message, to send the downlink data to the terminal device by using a downlink early data transmission process, the first access network device determines the first random access preamble index for the terminal device. Optionally, the first access network device further determines, for the terminal device, at least one of random access time-frequency resource indication information or an RNTI.

Step 606: The core network device sends, to the first access network device, the first random access preamble index that is ciphered and/or integrity protected by using a first security parameter.

Optionally, if the first access network device sends the random access time-frequency resource indication information to the core network device, the core network device further sends, to the first access network device, the random access time-frequency resource indication information that is ciphered and/or integrity protected by using the first security parameter.

For how the core network device performs ciphering and/or integrity protection by using the first security parameter, refer to the foregoing descriptions. Details are not described herein again.

Step 607: The first access network device sends a second paging message to the terminal device.

Step 608: The terminal device sends a first random access preamble to the first access network device.

In a possible implementation, if the terminal device successfully deciphers the first random access preamble index in the second paging message by using the first security parameter, and/or successfully performs integrity protection verification on the first random access preamble index by using the first security parameter, the terminal device sends the first random access preamble to the first access network device.

In a possible implementation, after the first access network device receives the first random access preamble from the terminal device, if determining that the first random access preamble is the random access preamble indicated by the first random access preamble index, the first access network device determines that the terminal device has correctly received the second paging message, so that the first access network device may obtain the downlink data of the terminal device. Specifically, the following steps may be included.

Step 609: The first access network device sends a downlink data request message to the core network device.

Step 610: After receiving the downlink data request message, the core network device sends a first NAS message to the first access network device, where the first NAS message includes the downlink data of the terminal device.

Step 611: The first access network device sends the first NAS message and feedback resource information to the terminal device, where the feedback resource information is used by the terminal device to send a first feedback message for the first NAS message.

The terminal device receives the feedback resource information and the first NAS message that includes the downlink data.

If the terminal device successfully deciphers the feedback resource information by using the first security parameter, and/or successfully performs integrity protection verification on the feedback resource information by using the first security parameter, step 612 may be performed.

Step 612: The terminal device sends the first feedback message based on the feedback resource information.

Step 613: The first access network device sends a second feedback message to the core network device.

For specific content of step 607 to step 613, refer to descriptions of corresponding steps in the procedure in FIG. 5. Details are not described herein again.

In the procedure shown in FIG. 6, a solution in which the core network device ciphers and/or integrity protects the first random access preamble index may also be used in a procedure of downlink early data transmission in a UP solution. When the solution is used in the downlink early data transmission in the UP solution, the procedure in FIG. 4 may be adaptively modified with reference to the procedures in FIG. 4 and FIG. 6, and a specific process is not described again.

Figure 7:
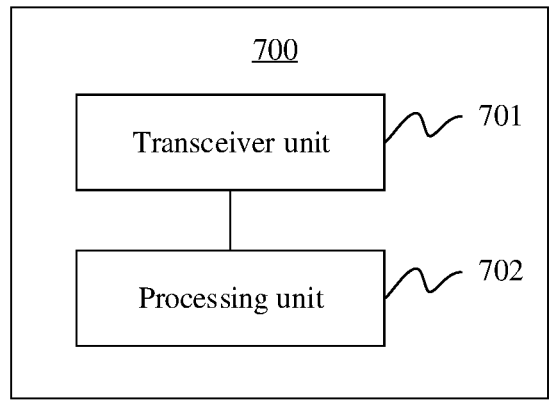
FIG. 7 is a schematic structural diagram of a data transmission apparatus according to an embodiment of this application.

FIG. 7 is a schematic structural diagram of a data transmission apparatus according to an embodiment of this application. The data transmission apparatus may be configured to perform actions of the first access network device, the terminal device, and the core network device in the foregoing method embodiments. The data transmission apparatus 700 includes a transceiver unit 701 and a processing unit 702.

When the data transmission apparatus 700 performs an action of the first access network device, the transceiver unit 701 is configured to: receive a first paging message from a core network device, where the first paging message includes a first security parameter; send a second paging message to a terminal device, where the second paging message includes a first random access preamble index that is ciphered and/or integrity protected by using the first security parameter; and receive a first random access preamble from the terminal device; the processing unit 702 is configured to: if determining that the first random access preamble is a random access preamble indicated by the first random access preamble index, obtain downlink data of the terminal device; and the transceiver unit 701 is configured to send the downlink data to the terminal device.

In a possible design, the transceiver unit 701 is specifically configured to: receive a first NAS message from the core network device, where the first NAS message includes the downlink data of the terminal device; and send the first NAS message and feedback resource information to the terminal device, where the feedback resource information is used by the terminal device to send a first feedback message for the first NAS message.

In a possible design, the transceiver unit 701 is further configured to: receive a second security parameter from the core network device.

In a possible design, the feedback resource information is ciphered and/or integrity protected by using the first security parameter; or the feedback resource information is ciphered and/or integrity protected by using the second security parameter.

In a possible design, the first security parameter and/or the second security parameter are/is an access stratum security parameter, and the access stratum security parameter includes at least one of an NCC, $K_{ASME}$, $K_{eNB}$, $K_{RRCenc}$, $K_{RRCInt}$, $K_{UPenc}$, or $K_{UPInt}$; or the first security parameter and/or the second security parameter are/is a non-access stratum security parameter, and the non-access stratum security parameter includes at least one of $K_{ASME}$, $K_{NASInt}$, $K_{NASenc}$, or a non-access stratum NAS COUNT.

When the data transmission apparatus 700 performs an action of the terminal device, the transceiver unit 701 is configured to receive a second paging message from a first access network device, where the second paging message includes a first random access preamble index that is ciphered and/or integrity protected by using a first security parameter; and the processing unit 702 is configured to: if successfully deciphering the first random access preamble index by using the first security parameter, and/or successfully performing integrity protection verification on the first random access preamble index by using the first security parameter, send a first random access preamble to the first access network device through the transceiver unit 701, where the first random access preamble is used to initiate a downlink early data transmission process, and the first random access preamble is a random access preamble indicated by the first random access preamble index.

In a possible design, the transceiver unit 701 is further configured to: receive a first NAS message and feedback resource information from the first access network device, where the first NAS message includes downlink data, and the feedback resource information is used to send a first feedback message for the first NAS message; and send the first feedback message based on the feedback resource information.

In a possible design, the transceiver unit 701 is further configured to: when the feedback resource information is ciphered and/or integrity protected by using the first security parameter, successfully decipher the feedback resource information by using the first security parameter, and/or successfully perform integrity protection verification on the feedback resource information by using the first security parameter.

When the data transmission apparatus 700 performs an action of the core network device, the processing unit 702 is configured to determine to send downlink data to a terminal device by using a downlink early data transmission process; and the transceiver unit 701 is configured to send a first paging message to a first access network device, where the first paging message includes a first security parameter, the first security parameter is used to cipher and/or integrity protect a first random access preamble index sent by the first access network device, and the first random access preamble index is used by the terminal device to request the downlink data from the first access network device.

In a possible design, the transceiver unit 701 is further configured to: receive the first security parameter from a second access network device.

When the data transmission apparatus 700 performs an action of the core network device, the processing unit 702 is configured to: determine to send downlink data to a terminal device by using a downlink early data transmission process; and determine a first random access preamble index, and cipher and/or integrity protect the first random access preamble index by using a first security parameter, where the first random access preamble index is used by the terminal device to request the downlink data from a first access network device; and the transceiver unit 701 is configured to send, to the first access network device, the first random access preamble index that is ciphered and/or integrity protected by using the first security parameter.

In a possible design, the transceiver unit 701 is further configured to: receive at least one random access preamble index; and the determining a first random access preamble index includes: selecting a random access preamble index from the at least one random access preamble index as the first random access preamble index.

In a possible design, the processing unit 702 is specifically configured to: send a first paging message to the first access network device, where the first paging message includes the first random access preamble index that is ciphered and/or integrity protected by using the first security parameter.

In a possible design, the transceiver unit 701 is further configured to: receive a data request message that is sent, where the data request message is used to request the downlink data of the terminal device; send the downlink data of the terminal device; receive a forwarded acknowledgement feedback message, where the feedback message includes to-be-verified data; and if determining that the to-be-verified data is a part or all of the downlink data, determine that the downlink data is successfully sent; otherwise, determine that the downlink data is unsuccessfully sent.

When the data transmission apparatus 700 performs an action of the first access network device, the transceiver unit 701 is configured to receive a first random access preamble index from a core network device, where the first random access preamble index is ciphered and/or integrity protected by using a first security parameter; send a second paging message to a terminal device, where the second paging message includes a first random access preamble index that is ciphered and/or integrity protected by using the first security parameter; and receive a first random access preamble from the terminal device; the processing unit 702 is configured to: if determining that the first random access preamble is a random access preamble indicated by the first random access preamble index, obtain downlink data of the terminal device; and the transceiver unit 701 is configured to send the downlink data to the terminal device.

In a possible design, the transceiver unit 701 is specifically configured to: receive a first NAS message from the core network device, where the first NAS message includes the downlink data of the terminal device; and send the first NAS message and feedback resource information to the terminal device, where the feedback resource information is used by the terminal device to send a first feedback message for the first NAS message.

In a possible design, the transceiver unit 701 is further configured to: receive a second security parameter from the core network device.

In a possible design, the feedback resource information is ciphered and/or integrity protected by using the first security parameter; or the feedback resource information is ciphered and/or integrity protected by using the second security parameter.

Figure 8:
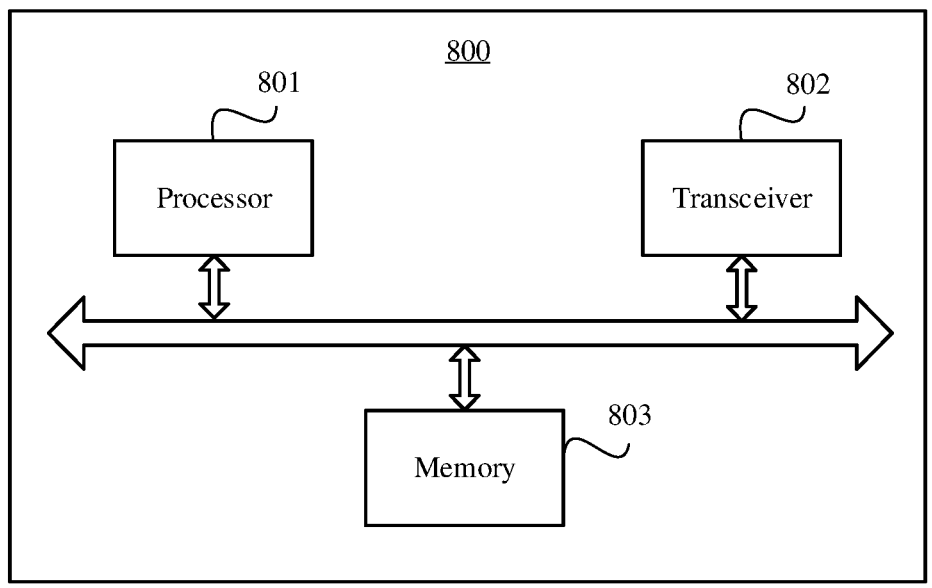
FIG. 8 is a schematic structural diagram of a data transmission apparatus according to an embodiment of this application.

FIG. 8 is a schematic structural diagram of a data transmission apparatus according to an embodiment of this application. The data transmission apparatus shown in FIG. 8 may be an implementation of a hardware circuit of the data transmission apparatus shown in FIG. 7. The data transmission apparatus is applicable to implement functions of the first access network device, the terminal device, and the core network device in the foregoing method embodiments. For ease of description, FIG. 8 shows only main components of the data transmission apparatus 800. The data transmission apparatus 800 includes a processor 801, a memory 803, and a transceiver 802. The memory 803 is configured to be coupled to the processor 801, and the memory 803 stores a necessary computer program of the data transmission apparatus 800.

When the data transmission apparatus 800 performs an action of the first access network device, the transceiver 802 is configured to: receive a first paging message from a core network device, where the first paging message includes a first security parameter; send a second paging message to a terminal device, where the second paging message includes a first random access preamble index that is ciphered and/or integrity protected by using the first security parameter; and receive a first random access preamble from the terminal device; the processor 801 is configured to: if determining that the first random access preamble is a random access preamble indicated by the first random access preamble index, obtain downlink data of the terminal device; and the transceiver 802 is configured to send the downlink data to the terminal device.

In a possible design, the transceiver 802 is specifically configured to: receive a first NAS message from the core network device, where the first NAS message includes the downlink data of the terminal device; and send the first NAS message and feedback resource information to the terminal device, where the feedback resource information is used by the terminal device to send a first feedback message for the first NAS message.

In a possible design, the transceiver 802 is further configured to: receive a second security parameter from the core network device.

In a possible design, the feedback resource information is ciphered and/or integrity protected by using the first security parameter; or the feedback resource information is ciphered and/or integrity protected by using the second security parameter.

In a possible design, the first security parameter and/or the second security parameter are/is an access stratum security parameter, and the access stratum security parameter includes at least one of an NCC, $K_{ASME}$, $K_{eNB}$, $K_{RRCenc}$, $K_{RRCInt}$, $K_{UPenc}$, or $K_{UPInt}$; or the first security parameter and/or the second security parameter are/is a non-access stratum security parameter, and the non-access stratum security parameter includes at least one of $K_{ASME}$, $K_{NASInt}$, $K_{NASenc}$, or a non-access stratum NAS COUNT.

When the data transmission apparatus 800 performs an action of the terminal device, the transceiver 802 is configured to receive a second paging message from a first access network device, where the second paging message includes a first random access preamble index that is ciphered and/or integrity protected by using a first security parameter; and the processor 801 is configured to: if successfully deciphering the first random access preamble index by using the first security parameter, and/or successfully performing integrity protection verification on the first random access preamble index by using the first security parameter, send a first random access preamble to the first access network device through the transceiver 802, where the first random access preamble is used to initiate a downlink early data transmission process, and the first random access preamble is a random access preamble indicated by the first random access preamble index.

In a possible design, the transceiver 802 is further configured to: receive a first NAS message and feedback resource information from the first access network device, where the first NAS message includes downlink data, and the feedback resource information is used to send a first feedback message for the first NAS message; and send the first feedback message based on the feedback resource information.

In a possible design, the transceiver 802 is further configured to: when the feedback resource information is ciphered and/or integrity protected by using the first security parameter, successfully decipher the feedback resource information by using the first security parameter, and/or successfully perform integrity protection verification on the feedback resource information by using the first security parameter.

When the data transmission apparatus 800 performs an action of the core network device, the processor 801 is configured to determine to send downlink data to a terminal device by using a downlink early data transmission process; and the transceiver 802 is configured to send a first paging message to a first access network device, where the first paging message includes a first security parameter, the first security parameter is used to cipher and/or integrity protect a first random access preamble index sent by the first access network device, and the first random access preamble index is used by the terminal device to request the downlink data from the first access network device.

In a possible design, the transceiver 802 is further configured to: receive the first security parameter from a second access network device.

When the data transmission apparatus 800 performs an action of the core network device, the processor 801 is configured to determine to send downlink data to a terminal device by using a downlink early data transmission process; and determine a first random access preamble index, and cipher and/or integrity protect the first random access preamble index by using a first security parameter, where the first random access preamble index is used by the terminal device to request the downlink data from a first access network device; and the transceiver 802 is configured to send, to the first access network device, the first random access preamble index that is ciphered and/or integrity protected by using the first security parameter.

In a possible design, the transceiver 802 is further configured to: receive at least one random access preamble index; and the determining a first random access preamble index includes: selecting a random access preamble index from the at least one random access preamble index as the first random access preamble index.

In a possible design, the processor 801 is specifically configured to: send a first paging message to the first access network device, where the first paging message includes the first random access preamble index that is ciphered and/or integrity protected by using the first security parameter.

In a possible design, the transceiver 802 is further configured to: receive a data request message that is sent, where the data request message is used to request the downlink data of the terminal device; send the downlink data of the terminal device; receive a forwarded acknowledgement feedback message, where the feedback message includes to-be-verified data; and if determining that the to-be-verified data is a part or all of the downlink data, determine that the downlink data is successfully sent; otherwise, determine that the downlink data is unsuccessfully sent.

When the data transmission apparatus 800 performs an action of the first access network device, the transceiver 802 is configured to: receive a first random access preamble index from a core network device, where the first random access preamble index is ciphered and/or integrity protected by using a first security parameter; send a second paging message to a terminal device, where the second paging message includes a first random access preamble index that is ciphered and/or integrity protected by using the first security parameter; and receive a first random access preamble from the terminal device; the processor 801 is configured to: if determining that the first random access preamble is a random access preamble indicated by the first random access preamble index, obtain downlink data of the terminal device; and the transceiver 802 is configured to send the downlink data to the terminal device.

In a possible design, the transceiver 802 is specifically configured to: receive a first NAS message from the core network device, where the first NAS message includes the downlink data of the terminal device; and send the first NAS message and feedback resource information to the terminal device, where the feedback resource information is used by the terminal device to send a first feedback message for the first NAS message.

In a possible design, the transceiver 802 is further configured to: receive a second security parameter from the core network device.

In a possible design, the feedback resource information is ciphered and/or integrity protected by using the first security parameter; or the feedback resource information is ciphered and/or integrity protected by using the second security parameter.

In a current LTE technology, a terminal device may receive earthquake and tsunami warning system (ETWS) information and commercial mobile alert service (CMAS) information in a connected mode, to cope with an emergent accident. However, an enhanced machine type communication (eMTC) terminal device has low complexity, and consequently cannot receive ETWS/CMAS information in a connected mode, and cannot cope with an emergent accident.

This application provides an ETWS/CMAS information receiving method and device. The method includes the following steps.

Step 1: A terminal device receives an ETWS/CMAS notification from a network device, where the ETWS/CMAS notification is used to indicate the terminal device to receive ETWS/CMAS information.

In a possible implementation, the terminal device is coverage enhancement capable UE (CE UE), or the terminal device is non bandwidth reduced and low complexity UE (non-BL UE).

In a possible implementation, the ETWS/CMAS notification is carried in downlink control information (DCI) scrambled by using a cell radio network temporary identifier (C-RNTI).

In a possible implementation, the ETWS/CMAS notification is carried in downlink control information scrambled by using a paging radio network temporary identifier (P-RNTI).

In a possible implementation, the ETWS/CMAS notification is carried in a physical downlink shared channel (PDSCH) scheduled by downlink control information scrambled by using a paging radio network temporary identifier (P-RNTI).

Step 2: The terminal device enters an idle mode based on the ETWS/CMAS notification.

Step 3: The terminal device receives the ETWS/CMAS information in the idle mode.

According to this application, when receiving the ETWS/CMAS notification, the eMTC terminal device can enter the idle mode to obtain the ETWS/CMAS information in a timely manner, and cope with an emergent accident in the timely manner.

1. An ETWS/CMAS information receiving method, comprising: receiving, by a terminal device, an ETWS/CMAS notification from a network device, wherein the ETWS/CMAS notification is used to indicate the terminal device to receive ETWS/CMAS information; entering, by the terminal device, an idle mode based on the ETWS/CMAS notification; and receiving, by the terminal device, the ETWS/CMAS information in the idle mode.

2. The method according to claim 1, wherein the method further comprises: the terminal device is CE UE, or the terminal device is non-BL UE in CE.

3. The method according to claim 1 or 2, wherein the method further comprises: the ETWS/CMAS notification is carried in DCI scrambled by using a C-RNTI; the ETWS/CMAS notification is carried in DCI scrambled by using a P-RNTI; or the ETWS/CMAS notification is carried in a PDSCH scheduled by DCI that is scrambled by using a P-RNTI.

4. An ETWS/CMAS information receiving terminal device, wherein the terminal device comprises: a receiving unit and a processing unit, wherein the receiving unit is configured to receive an ETWS/CMAS notification from a network device, wherein the ETWS/CMAS notification is used to indicate the terminal device to receive ETWS/CMAS information; the processing unit is configured to enter an idle mode based on the ETWS/CMAS notification; and the receiving unit receives the ETWS/CMAS information in the idle mode.

5. The terminal device according to claim 4, wherein the terminal device further comprises: the terminal device is CE UE, or the terminal device is non-BL UE in CE.

6. The terminal device according to claim 4 or 5, wherein the terminal device further comprises: the ETWS/CMAS notification is carried in DCI scrambled by using a C-RNTI; the ETWS/CMAS notification is carried in DCI scrambled by using a P-RNTI; or the ETWS/CMAS notification is carried in a PDSCH scheduled by DCI that is scrambled by using a P-RNTI.

In a current LTE-MTC technology, when coverage enhancement capable UE (CE UE) cannot obtain, in normal coverage of a cell, a system information block 1 (SystemInformationBlock1) of the cell, the CE UE determines that the cell is forbidden. If the CE UE can obtain, in enhanced coverage (enhanced coverage) of the cell, a master information block and a bandwidth reduced (BR) system information block 1 (SystemInformationBlock1-BR) of the cell, and if cell selection criteria are satisfied, the CE UE may select the cell to camp on. In this case, in the normal coverage, the CE UE consequently cannot perform communication in an enhanced coverage working mode, and user experience of the CE UE in the normal coverage is affected.

This application provides a cell selection method and device. The method includes the following steps.

Step 1: A terminal device determines, in coverage of a cell, that cell selection criteria are satisfied.

In a possible implementation, the cell is a cell that is forbidden because the terminal device cannot obtain, in normal coverage of the cell, a system information block 1 of the cell.

In a possible implementation, the cell is a standalone cell. The standalone cell is a cell that supports only an MTC technology and does not support a conventional LTE technology (for example, an LTE technology in Rel-8 to Rel-11).

In a possible implementation, the terminal device is CE UE.

Step 2: The terminal device selects, in enhanced coverage of the cell, the cell.

In a possible implementation, if the terminal device may obtain, in the enhanced coverage of the cell, a master information block and a bandwidth reduced system information block 1 of the cell, the terminal device selects, in the enhanced coverage of the cell, the cell.

In a possible implementation, if the terminal device may obtain, in the enhanced coverage of the cell, a master information block, a bandwidth reduced system information block 1, and a bandwidth reduced system information block 2 of the cell, the terminal device selects, in the enhanced coverage of the cell, the cell.

According to this application, in the normal coverage, the terminal device can perform communication in an enhanced coverage working mode, and user experience of the CE UE in the normal coverage is improved.

1. A cell selection method, comprising: determining, by a terminal device, in coverage of a cell, that cell selection criteria are satisfied, wherein the cell is a cell that is forbidden because the terminal device cannot obtain, in normal coverage of the cell, a system information block 1 of the cell, or the cell is a standalone cell; and selecting, by the terminal device, in enhanced coverage of the cell, the cell.

2. The method according to claim 1, wherein the method further comprises: if the terminal device may obtain, in the enhanced coverage of the cell, a master information block and a bandwidth reduced system information block 1 of the cell, selecting, by the terminal device, in the enhanced coverage of the cell, the cell; or if the terminal device may obtain, in the enhanced coverage of the cell, a master information block, a bandwidth reduced system information block 1, and a bandwidth reduced system information block 2 of the cell, selecting, by the terminal device, in the enhanced coverage of the cell, the cell.

3. A terminal device for performing cell selection, wherein the terminal device comprises: a processing unit and a selection unit, wherein the processing unit is configured to determine, in coverage of a cell, that cell selection criteria are satisfied, wherein the cell is a cell that is forbidden because the terminal device cannot obtain, in normal coverage of the cell, a system information block 1 of the cell, or the cell is a standalone cell; and the selection unit is configured to select, in enhanced coverage of the cell, the cell.

4. The terminal device according to claim 3, wherein the terminal device further comprises: if the processing unit may obtain, in the enhanced coverage of the cell, a master information block and a bandwidth reduced system information block 1 of the cell, selecting, by the selection unit, in the enhanced coverage of the cell, the cell; or if the processing unit may obtain, in the enhanced coverage of the cell, a master information block, a bandwidth reduced system information block 1, and a bandwidth reduced system information block 2 of the cell, selecting, by the selection unit, in the enhanced coverage of the cell, the cell.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A cell selection method, comprising:
determining, by a terminal device, in coverage of a cell, that cell selection criteria is satisfied, wherein the cell is determined to be forbidden based on the terminal device cannot obtain, in normal coverage of the cell, a system information block 1 of the cell;
selecting, by the terminal device, in enhanced coverage of the cell, the cell; and
performing, by the terminal device, in the normal coverage of the cell, communication in an enhanced coverage mode.

2. The method according to claim 1, further comprising:
in response to the terminal device being able to obtain, in the enhanced coverage of the cell, a master information block, a bandwidth reduced system information block 1, and a bandwidth reduced system information block 2 of the cell, selecting, by the terminal device, in the enhanced coverage of the cell, the cell.

3. The cell selection method according to claim 1, wherein the cell is a standalone cell.

4. The cell selection method according to claim 3, wherein the standalone cell supports only an machine type communication (MTC) technology.

5. The cell selection method according to claim 1, further comprising:
in response to the terminal device being able to obtain, in the enhanced coverage of the cell, a master information block and a bandwidth reduced system information block 1, selecting, by the terminal device, in the enhanced coverage of the cell, the cell.

6. A terminal device for performing cell selection, wherein the terminal device comprises:
a processor; and
a non-transitory computer readable storage medium storing programming for execution by the processor, the programming including instructions to:
determine, in coverage of a cell, that cell selection criteria is satisfied, wherein the cell is determined to be forbidden based on the terminal device cannot obtain, in normal coverage of the cell, a system information block 1 of the cell;
select, in enhanced coverage of the cell, the cell; and
perform, by the terminal device, in the normal coverage of the cell, communication in an enhanced coverage mode.

7. The terminal device according to claim 6, wherein the programming further comprises instructions to:
in response to the terminal device being able to obtain, in the enhanced coverage of the cell, a master information block, a bandwidth reduced system information block 1, and a bandwidth reduced system information block 2 of the cell are able to be obtained, select, in the enhanced coverage of the cell, the cell.

8. The terminal device according to claim 7, wherein the cell is a standalone cell.

9. The terminal device according to claim 8, wherein the standalone cell supports only a machine type communication (MTC) technology.

10. The terminal device according to claim 7, wherein the programming further comprises instructions to:
in response to the terminal device being able to obtain, in the enhanced coverage of the cell, a master information block and a bandwidth reduced system information block 1, selecting, by the terminal device, in the enhanced coverage of the cell, the cell.

11. A non-transitory computer readable storage medium storing a program that is executable by at least one processor, the program including instructions for:
determining, by a terminal device, in coverage of a cell, that cell selection criteria is satisfied, wherein the cell determined to be forbidden due to that the terminal device cannot obtain, in normal coverage of the cell, a system information block 1 of the cell;
selecting, by the terminal device, in enhanced coverage of the cell, the cell; and
performing, by the terminal device, in the normal coverage of the cell, communication in an enhanced coverage mode.

12. The non-transitory computer readable storage medium according to claim 11, wherein the cell is a standalone cell.

13. The non-transitory computer readable storage medium according to claim 12, wherein the standalone cell supports only a machine type communication (MTC) technology.

14. The non-transitory computer readable storage medium according to claim 11, wherein the program further comprises instructions for:
in response to the terminal device being able to obtain, in the enhanced coverage of the cell, a master information block and a bandwidth reduced system information block 1, selecting, by the terminal device, in the enhanced coverage of the cell, the cell.

15. The non-transitory computer readable storage medium according to claim 11, wherein the program further comprises instructions for:
in response to the terminal device being able to obtain, in the enhanced coverage of the cell, a master information block a bandwidth reduced system information block 1, and a bandwidth reduced system information block 2 of the cell, selecting, by the terminal device, in the enhanced coverage of the cell, the cell.

* * * * *